United States Patent [19]
Hughes et al.

[11] Patent Number: 5,991,140
[45] Date of Patent: Nov. 23, 1999

[54] TECHNIQUE FOR EFFECTIVELY RE-ARRANGING CIRCUITRY TO REALIZE A COMMUNICATIONS SERVICE

[75] Inventors: Philip Hughes, Westfield; Adam Stuart Kane, Morristown; Kriss Kalani Replogle, Brookside; Andrew Schwartz, Morris Township, Morris County, all of N.J.

[73] Assignee: Lucent Technologies Inc., Murray Hill, N.J.

[21] Appl. No.: 08/994,683

[22] Filed: Dec. 19, 1997

[51] Int. Cl.[6] ...................................................... H02H 1/00
[52] U.S. Cl. ............................ 361/119; 361/103; 361/115
[58] Field of Search ..................................... 361/119, 115, 361/93, 103, 91, 58

[56] References Cited

U.S. PATENT DOCUMENTS

| | | | |
|---|---|---|---|
| 5,034,846 | 7/1991 | Hodge et al. | 361/119 |
| 5,207,583 | 5/1993 | DeBalko et al. | 439/49 |
| 5,812,786 | 9/1998 | Seazholtz et al. | 395/200.63 |

OTHER PUBLICATIONS

"Test Cords Selection Guide," *Distributing Frame System Products Manual (DFSPM)*, AT&T Network Systems, Dec. 1993, pp. 8–10 through 8–18.

"Bantam Plus™ DSX–1/1C System Patch Cords and Accessories," *AT&T ExchangeMax™ Structured Cabling System for the Central Office*, Product Applications Catalog, AT&T Network Systems 1993, pp. 3–30 & 3–31.

"System III DSX–3/4 Patch Cords," *AT&T ExchangeMax™ Structured Cabling System for the Central Office*, Product Applications Catalog, AT&T Network Systems 1993, p. 3–49.

"Cords 110 Patch Cords and Adapter Cords," http:// 207.140.138.105:5000/sysx/getFamOverview?p FamID= 5054&p_AreaID=3123, Sep. 28, 1997.

"AT&T Protector Units," *Distributing Frame Systems Products Manual (DFSPM)*, AT&T Network Systems, Dec. 1993, pp. 2–1, 2–4, 2–5 & 2–9.

*Primary Examiner*—Stephen W. Jackson

[57] ABSTRACT

In a communications arrangement, a copper wire pair arrangement traditionally used to provide a plain old telephone service (POTS) is also used to provide an asymmetric digital subscriber line (ADSL) service. To that end, a patch cord in accordance with the invention is used to re-arrange communications connections in a terminal where both POTS channel unit and ADSL channel unit are deployed. Advantageously, the combined service is efficiently realized by such a re-arrangement, with the existing POTS virtually uninterrupted.

17 Claims, 2 Drawing Sheets

TECHNIQUE FOR EFFECTIVELY RE-ARRANGING CIRCUITRY TO REALIZE A COMMUNICATIONS SERVICE

FIELD OF THE INVENTION

The invention relates to techniques for arranging communications connections, and more particularly to a technique for arranging communications connections using, e.g., a patch cord to realize a communications service based on an existing service.

BACKGROUND OF THE INVENTION

Use of a modem, e.g., incorporated in a personal computer, to access the Internet and other on-line services to obtain information is ubiquitous. The on-line access, especially from home, is typically achieved via a plain old telephone service (POTS), where a telephone line comprising a pair of copper wires provides a two-way communication path between the modem and a central office (CO). The latter connects the modem to a specified on-line service provider through a public switched telephone network (PSTN).

In an on-line access connection, uplink traffic from a modem to a CO typically contains requests for information, which does not require much bandwidth. On the other hand, downlink traffic from the CO to the modem typically contains the requested information for downloading, which requires significantly more bandwidth. Based on this observation, telephone companies are introducing new services, including an asymmetric digital subscriber line (ADSL) service, which permits fast on-line access. For example, the ADSL service supports uplink traffic having a maximum bit rate on the order of 1 Mb/s, and downlink traffic having a maximum bit rate on the order of 10 Mb/s. For economic reasons, the ADSL traffic traverses the same copper wire pair traditionally used as the telephone line in the POTS.

SUMMARY OF THE INVENTION

The combination of the POTS and the ADSL service can be accomplished using a conventional diplexer located on an ADSL channel unit, in conjunction with certain re-wiring to realize the combined service on the existing copper wire pair arrangement. Telephone company craft procedures suggest that any re-wiring be performed at a feeder distribution interface (FDI) from which subscriber lines extend. However, we have recognized that the necessary rewiring at the FDI would be time-consuming and error prone.

In accordance with the invention, the requisite re-wiring is performed in a terminal where a POTS channel unit and the ADSL channel unit are deployed, the re-wiring is realized by connecting the POTS channel unit to the ADSL channel unit through a diplexer thereon. Such a connection is achieved using, e.g., a patch cord. The patch cord in accordance with the invention includes a circuit for protecting equipment including the channel units in the terminal from, e.g., an over-voltage condition therein.

BRIEF DESCRIPTION OF THE DRAWING

In the drawing.

Throughout this disclosure, unless otherwise stated, like elements, components and sections in the figures are denoted by the same numerals.

DETAILED DESCRIPTION

As subscribers to a plain old telephone service (POTS) demand fast access to the Internet and other on-line services, telephone companies are introducing new services, including an asymmetric digital subscriber line (ADSL) service, to meet such a demand. For economic reasons, these services use the same telephone lines comprising copper wire pairs as the POTS.

Figure 1:
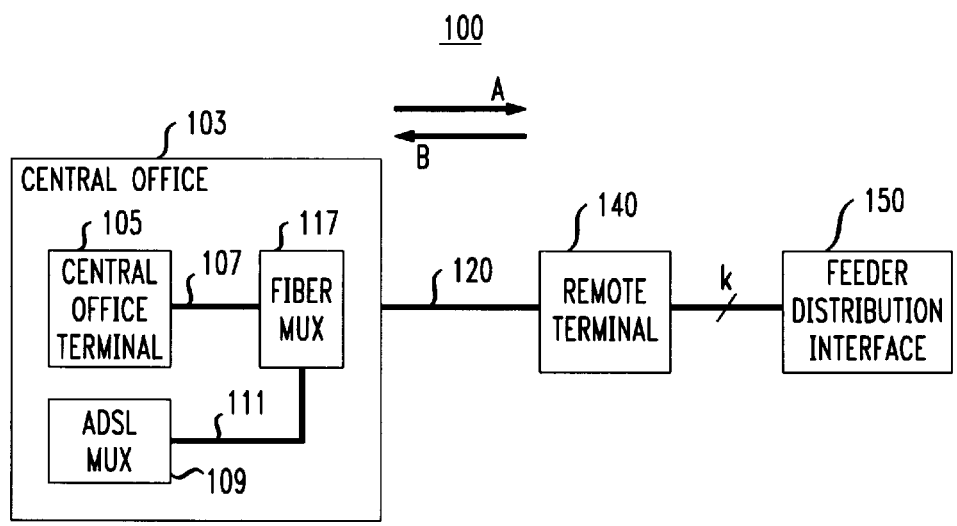
FIG. 1 is a block diagram of a communications arrangement in accordance with the invention.

FIG. 1 illustrates communications arrangement 100 embodying the principles of the invention. In arrangement 100, central office (CO) 103 connected to a public switched telephone network (PSTN) provides the POTS and ADSL service. To that end, CO 103 is equipped with central office terminal 105 furnishing the POTS, and ADSL multiplexer/demultiplexer (MUX) 109 furnishing the ADSL service. In a well known manner, terminal 105 processes the POTS traffic between the PSTN and connection 107. In this instance, connection 107 transports the POTS traffic in a well known standard digital signal 1 (DS1) format. Similarly, MUX 109 processes the ADSL traffic between the PSTN and connection 111. In this instance, connection 111 transports the ADSL traffic in a well known standard digital signal 3 (DS3) format.

Optical fiber 120 extends from fiber MUX 117 in CO 103 to remote terminal 140 close to subscriber premises, e.g., a cluster of homes. In a well known manner, MUX 117 in direction A multiplexes the aforementioned POTS traffic and ADSL traffic onto fiber 120 which carries the composite traffic in a well known standard optical carrier 3 (OC3) format. In direction B, MUX 117 demultiplexes the composite traffic from fiber 120 into the respective POTS and ADSL traffic.

The arrangement of terminal 140 in accordance with the invention is fully described below. It suffices to know for now that terminal 140 provides k copper wire pairs traditionally used in the POTS for connection with, e.g., telephone equipment in subscriber premises, where k is the number of wire pairs emanating from terminal 140 typically determined by a person skilled in the art who implements terminal 140. These copper wire pairs, known as "feeder pairs," are each associated with a different telephone number. The feeder pairs are distributed to subscriber premises through feeder distribution interface (FDI) 150 of conventional design. In a well known manner, FDI 150 is used to cross-connect the feeder pairs to subscriber lines. The latter which also comprise copper wire pairs, known as "distribution pairs," run from interface 150 to the subscriber premises.

Utilizing the wire pair arrangement traditionally used to serve the POTS only, the ADSL service supports uplink traffic from a subscriber line (i.e., in direction B) having a maximum bit rate on the order of 1 Mb/s, and downlink traffic to the subscriber line (i.e., in direction A) having a maximum bit rate on the order of 10 Mb/s.

Figure 2:
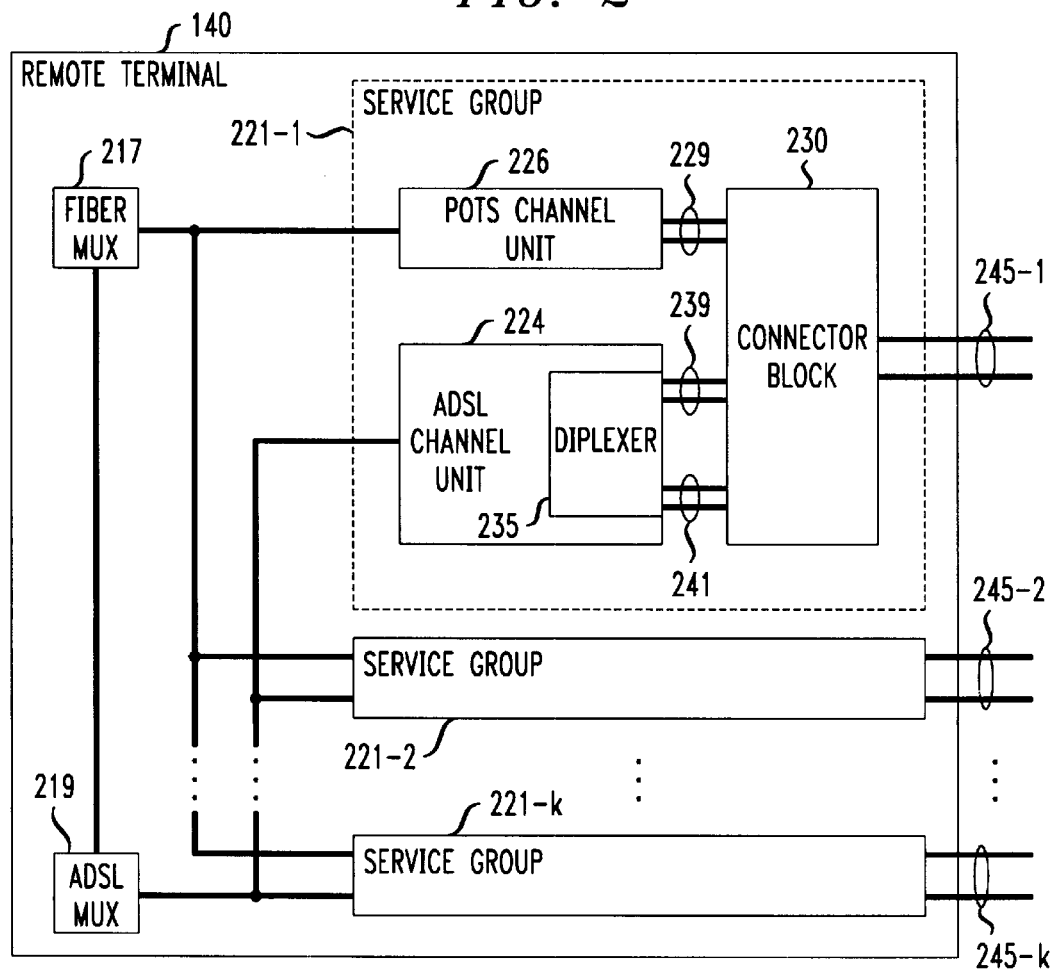
FIG. 2 illustrates a remote terminal in the communications arrangement of FIG. 1.

Terminal 140 in accordance with the invention providing both the POTS and ADSL service on each feeder pair extending therefrom will now be described. Referring to FIG. 2, terminal 140 includes fiber MUX 217 which performs the inverse function to fiber mux 117 described before. For example, MUX 217 in direction A demultiplexes the aforementioned composite traffic from optical fiber 120 into the respective POTS traffic in the standard DS1 format and ADSL traffic in the standard DS3 format. The ADSL traffic is fed to ADSL MUX 219 for further processing. Fiber MUX 217 and ADSL MUX 219 are connected to service groups 221-1 through 221-k to be described. The aforementioned k feeder pairs, denoted 245-1 through 245-k here, extend from the k service groups, respectively.

In this particular illustrative embodiment, each service group is similarly arranged, and associated with a subscriber line corresponding to the feeder pair extending therefrom. In direction A, ADSL MUX 219 demultiplexes the ADSL traffic from fiber MUX 217 into individual downlink traffic streams to specified subscriber lines. In direction B, MUX 219 multiplexes individual uplink traffic streams from the subscriber lines to form the ADSL traffic to MUX 217. The uplink and downlink traffic streams of each subscriber line are processed by an ADSL channel unit in the service group associated with the subscriber line.

Without loss of generality, service group 221-1 includes a controller for providing the ADSL service, e.g., ADSL channel unit 224, which formats (deformats) the uplink (downlink) traffic stream in the subscriber line corresponding to feeder pair 245-1 according to the ADSL service. In an on-line access connection using the ADSL service, the uplink traffic stream typically contains requests to service providers for information which does not require much bandwidth. On the other hand, the downlink traffic stream typically contains the requested information for downloading, which requires significantly more bandwidth. It should be noted that a physical ADSL channel unit in the field normally has two ports, each serving a subscriber line. In that case, ADSL channel unit 224 represents only the portion of the physical ADSL channel unit corresponding to one of the two ports, which serves the subscriber line corresponding to feeder pair 245-1.

Group 221-1 also includes POTS channel unit 226 which in direction A demultiplexes the aforementioned POTS traffic from MUX 217 into individual telephone traffic streams to specified subscriber lines. In direction B, unit 226 multiplexes individual telephone traffic streams from the subscriber lines to form the POTS traffic to MUX 217. It should also be noted that a physical POTS channel unit in the field normally has two or four ports, each serving a subscriber line. Thus, for example, where the physical POTS channel unit has two ports, POTS channel unit 226 represents only the portion of the physical POTS channel unit corresponding to one of the two ports, which serves the subscriber line corresponding to feeder pair 245-1.

As shown in FIG. 2, POTS channel unit 226 is connected through the aforementioned port to connector block 230 via wire pair 229. In prior art where only the POTS is provided, a protector unit is inserted into block 230 such that the protector unit is in series with wire pair 229 and feeder pair 245-1. In a well known design, this protector unit is used in the POTS to afford an over-voltage protection to equipment including the POTS channel unit in the remote terminal.

Conventional ADSL channel units, e.g., unit 224, help provide ADSL service only while conventional POTS channel units, e.g. unit 226, help provide the POTS service only. The combination of the POTS and the ADSL service can be accomplished using a conventional diplexer located on an ADSL channel unit, in conjunction with certain re-wiring to realize the combined service on the existing copper wire pair arrangement. Telephone company craft procedures suggest that any re-wiring be performed at an FDI. However, we have recognized that the necessary re-wiring at the FDI would be time-consuming and error prone.

In accordance with the invention, the requisite re-wiring is performed in remote terminal 140 using a patch cord to be described. Diplexer 235 in ADSL channel unit 224 has two wire pairs denoted 239 and 241 extending therefrom. These wire pairs are connected to connector block 230. By applying the patch cord into block 230 in a manner to be described, wire pair 239 is connected with wire pair 229 which carries only a POTS traffic stream in the corresponding subscriber line. In addition, wire pair 241 which carries a POTS and/or ADSL traffic stream in the corresponding subscriber line is connected to feeder pair 245-1.

Figure 3:
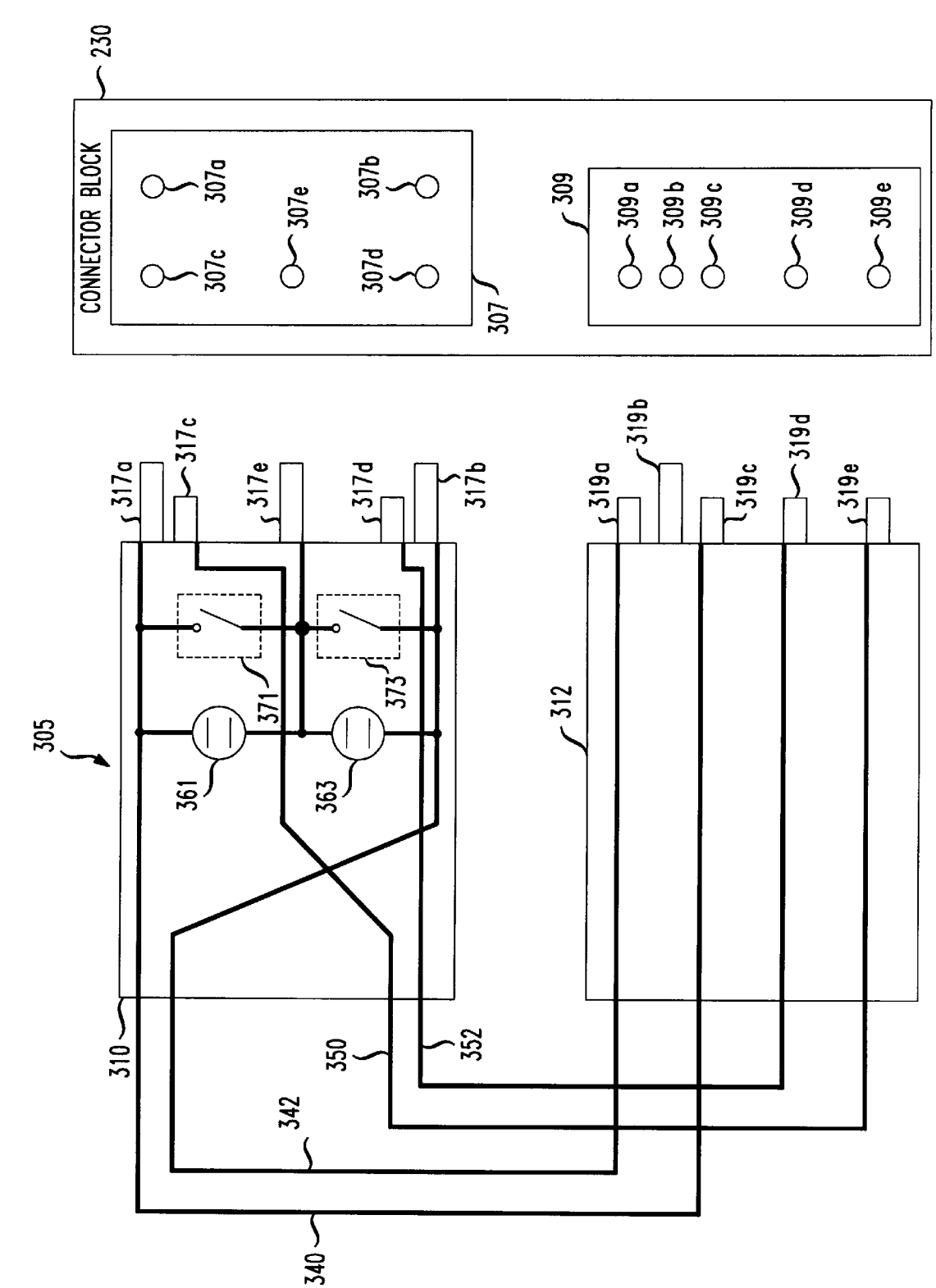
FIG. 3 illustrates a connector block in the remote terminal of FIG. 2 and a patch cord in accordance with the invention for re-arranging communication connections to realize both the POTS and ADSL service.

FIG. 3 illustrates connector block 230 and patch cord 305 for realizing the above connections involving wire pairs 229, 239 and 241, and feeder pair 245-1 in accordance with the invention. In FIG. 3, connector block 230 includes connector sub-blocks 307 and 309, wherein only the relevant female connectors are shown. Sub-block 307 includes female connectors 307a through 307e. Specifically, connectors 307a and 307b are respectively connected to the individual wires in feeder pair 245-1. Connectors 307c and 307d are respectively connected to the individual wires in wire pair 229. Connector 307e is grounded.

Sub-block 309 includes female connectors 309a through 309e. Specifically, connectors 309a and 309c are respectively connected to the individual wires in wire pair 241. Connectors 309d and 309e are respectively connected to the individual wires in wire pair 239. Connector 309b is connected to ground.

In the prior art POTS, the aforementioned protector unit is inserted into sub-block 307 affording an over-voltage protection to equipment in the remote terminal. However, in accordance with the invention, plug 310 of patch cord 305 is inserted in sub-block 307, instead. As shown in FIG. 3, patch cord 305 has male connectors 317a through 317e extending from an end of plug 310, which are used to mate with female connectors 307a through 307e, respectively.

In patch cord 305, male connectors 317a and 317b are respectively connected, via leads 340 and 342, to male connectors 319a and 319c on an end of plug 312. In addition male connectors 317c and 317d are respectively connected, via leads 350 and 352, to male connectors 319d and 319e on the end of plug 312. Male connectors 319a through 319e are used to mate with female connectors 309a through 309e on sub-block 309, respectively. It should be pointed out that male connector 319b is an unconnected, dummy connector for mating with female connector 309b. Connector 319b is used to polarize plug 312 to ensure its proper orientation when it is inserted into sub-block 309. Otherwise, without connector 319b, connectors 319a, 319c, 319d and 319e may not be correctly inserted into the supposed female connectors in sub-block 309.

Thus, with the connectors on plugs 310 and 312 of patch cord 305 inserted into connector sub-blocks 307 and 309, respectively, wire pair 239 from diplexer 235 in FIG. 2 is connected with wire pair 229 from POTS channel unit 226 via leads 350 and 352 carrying a POTS traffic stream only. Wire pair 241 from diplexer 235 is connected with feeder pair 245-1 via leads 340 and 342 carrying a POTS and/or ADSL traffic stream.

In accordance with an aspect of the invention, a protection circuit is included in plug 310 to afford an over-voltage protection to equipment in terminal 140, e.g., POTS channel unit 226 and ADSL channel unit 224, which is exposed to such external factors as lightning through the connected feeder pairs. This protection circuit includes voltage sensitive switches 361 and 363, and thermo-sensitive switches 371 and 373 for protecting switches 361 and 363 from an over-heat condition therein. Switches 361 and 363 may each comprise a carbon block, gas tube or solid state device for sensing any over-voltage. Switch 361 is connected at its one end to lead 340 and at its other end to ground connector 317e. In addition, switch 363 is connected at its one end to lead 342 and at its other end to ground connector 317e. In the event that lightning, a power fault or an AC power cross occurs at feeder pair 245-1, an over-voltage on connector 317a and/or connector 317b is accordingly detected by switch 361 and/or switch 363. Upon detection of one such over-voltage, the corresponding switch closes, thereby safely conducting the over-voltage to ground via connector 317e.

Similarly, thermo-sensitive switch 371 is connected at its one end to lead 340 and at its other end to ground connector 317e. In addition, switch 373 is connected at its one end to lead 342 and at its other end to ground connector 317e. In the event that an over-heat condition develops in voltage sensitive switch 361 and/or switch 363 occasioned by, e.g., an AC power cross at feeder pair 245-1, excessive heat from switch 361 and/or switch 363 is accordingly detected by thermo-sensitive switch 371 and/or switch 373. Upon detection of such excessive heat, the corresponding thermo-sensitive switch closes, thereby safely conducting, in this instance, the AC power cross current to ground via connector 317e.

It is noteworthy that the above re-wiring by patch cord 305 in accordance with the invention is advantageous in that, among other things, the re-wiring virtually unaffects the on-going service by the POTS channel unit involved. In fact, the telephone services furnished by the ports of the physical channel unit other than the one under conversion are completely uninterrupted.

The foregoing merely illustrates the principles of the invention. It will thus be appreciated that a person skilled in the art will be able to devise numerous systems which, although not explicitly shown or described herein, embody the principles of the invention and are thus within its spirit and scope.

For example, the invention is applicable not only to the ADSL service in combination with the POTS as disclosed, but also generally applicable to any xDSL service, such as a high-speed digital subscriber line (HDSL) service and a very high-speed digital subscriber line (VDSL) service, in combination therewith.

Finally, although communications arrangement 100 as disclosed is embodied in the form of various discrete functional blocks, arrangement 100 could equally well be embodied in a different arrangement in which the functions of any one or more of those blocks or indeed, all of the functions thereof, are realized, for example, by one or more appropriately programmed processors or devices.

We claim:

1. Apparatus for realizing a circuit comprising:
   a plurality of plugs each having at an end thereof a plurality of connectors for arranging the circuit; and
   a protection circuit in a selected one of the plurality of plugs, the protection circuit being connected to one or more of the connectors in the selected plug, the protection circuit comprising at least one voltage detector for detecting an over-voltage in the one or more connectors, and at least one switch for sensing heat in the voltage detector, the switch switching from a first position to a second position thereof when an over-heat condition in the voltage detector is sensed thereby.

2. The apparatus of claim 1 comprising a patch cord.

3. The apparatus of claim 1 wherein the plurality of the connectors of at least one of the plugs comprise at least one male connector.

4. The apparatus of claim 1 wherein the plurality of the connectors of at least one of the plugs comprise at least one connector for polarizing the at least one of the plugs.

5. An arrangement situated between a central office and subscriber premises, the central office providing at least a telephone service to the subscriber premises, the arrangement including a first circuit for realizing the telephone service, and a connector block for connecting at least one protector unit, placeable on the connector block, to the first circuit, the arrangement comprising:
   a controller for providing a second service; and
   a second circuit, disposed on the connector block in lieu of the at least one protector unit, for connecting the controller to the first circuit to provide the second service over the first circuit.

6. The arrangement of claim 5 wherein the first circuit comprises a pair of copper wires.

7. The arrangement of claim 5 wherein the second service comprises an asymmetric digital subscriber line (ADSL) service.

8. The arrangement of claim 7 wherein the controller comprises an ADSL channel unit.

9. The arrangement of claim 8 wherein the ADSL channel unit includes a diplexer.

10. The arrangement of claim 5 wherein the second circuit comprises a patch cord.

11. The arrangement of claim 10 wherein the patch cord includes a third circuit for protecting at least the controller.

12. The arrangement of claim 11 wherein the third circuit includes a voltage sensor for detecting an over voltage in the first circuit.

13. The arrangement of claim 12 wherein the third circuit includes a second sensor for detecting an over-heat condition in the voltage sensor.

14. A method for use in an arrangement situated between a central office and subscriber premises, the central office providing at least a telephone service to the subscriber premises, the arrangement including a controller, a first circuit for realizing the telephone service, and a connector block for connecting at least one protector unit, placeable on the connector block, to the first circuit, the method comprising:
   providing a second service using the controller; and
   connecting the controller to the first circuit to provide the second service over the first circuit by arranging on the connector block a second circuit in lieu of the at least one protector unit.

15. The method of claim 14 wherein the second service comprises an ADSL service.

16. The method of claim 14 further comprising detecting an over-voltage in the first circuit using at least one voltage detector.

17. The method of claim 16 further comprising sensing an over-heat condition in the voltage detector.

* * * * *